(12) United States Patent
Hattori et al.

(10) Patent No.: US 9,527,513 B2
(45) Date of Patent: Dec. 27, 2016

(54) CONTROL APPARATUS FOR VEHICLE

(71) Applicant: TOYOTA JIDOSHA KABUSHIKI KAISHA, Toyota-shi, Aichi-ken (JP)

(72) Inventors: Kunio Hattori, Nagoya (JP); Wataru Matsubara, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/041,261

(22) Filed: Feb. 11, 2016

(65) Prior Publication Data
US 2016/0236686 A1    Aug. 18, 2016

(30) Foreign Application Priority Data

Feb. 17, 2015 (JP) ................................ 2015-029091

(51) Int. Cl.
| | |
|---|---|
| *B60W 10/06* | (2006.01) |
| *B60W 10/107* | (2012.01) |
| *B60W 30/188* | (2012.01) |
| *B60W 10/04* | (2006.01) |
| *B60W 30/19* | (2012.01) |
| *F16H 61/662* | (2006.01) |

(52) U.S. Cl.
CPC ............ *B60W 30/188* (2013.01); *B60W 10/04* (2013.01); *B60W 10/107* (2013.01); *B60W 30/19* (2013.01); *F16H 61/662* (2013.01); *B60W 2510/1005* (2013.01); *B60W 2560/00* (2013.01); *B60W 2710/105* (2013.01)

(58) Field of Classification Search
None
See application file for complete search history.

(56) References Cited

U.S. PATENT DOCUMENTS

| | | | | |
|---|---|---|---|---|
| 2012/0088629 | A1* | 4/2012 | Aoyama | B60W 10/02 477/39 |
| 2012/0184405 | A1* | 7/2012 | Morimura | B60W 10/06 477/54 |
| 2012/0302398 | A1* | 11/2012 | Vesala | B60W 30/1886 477/68 |

FOREIGN PATENT DOCUMENTS

| | | |
|---|---|---|
| JP | H11-51164 A | 2/1999 |
| JP | 2010-247623 A | 11/2010 |

* cited by examiner

*Primary Examiner* — Edwin A Young
(74) *Attorney, Agent, or Firm* — Oliff PLC

(57) ABSTRACT

In correcting a throttle opening degree for speed ratio control in accordance with an auxiliary load torque, when the throttle opening degree for speed ratio control is corrected in an increasing manner such that an engine rotational speed rises, a smoothing process of changes in a throttle opening degree correction amount is executed. When the throttle opening degree for speed ratio control is corrected in a decreasing manner such that the engine rotational speed falls, the aforementioned smoothing process is not executed.

6 Claims, 4 Drawing Sheets

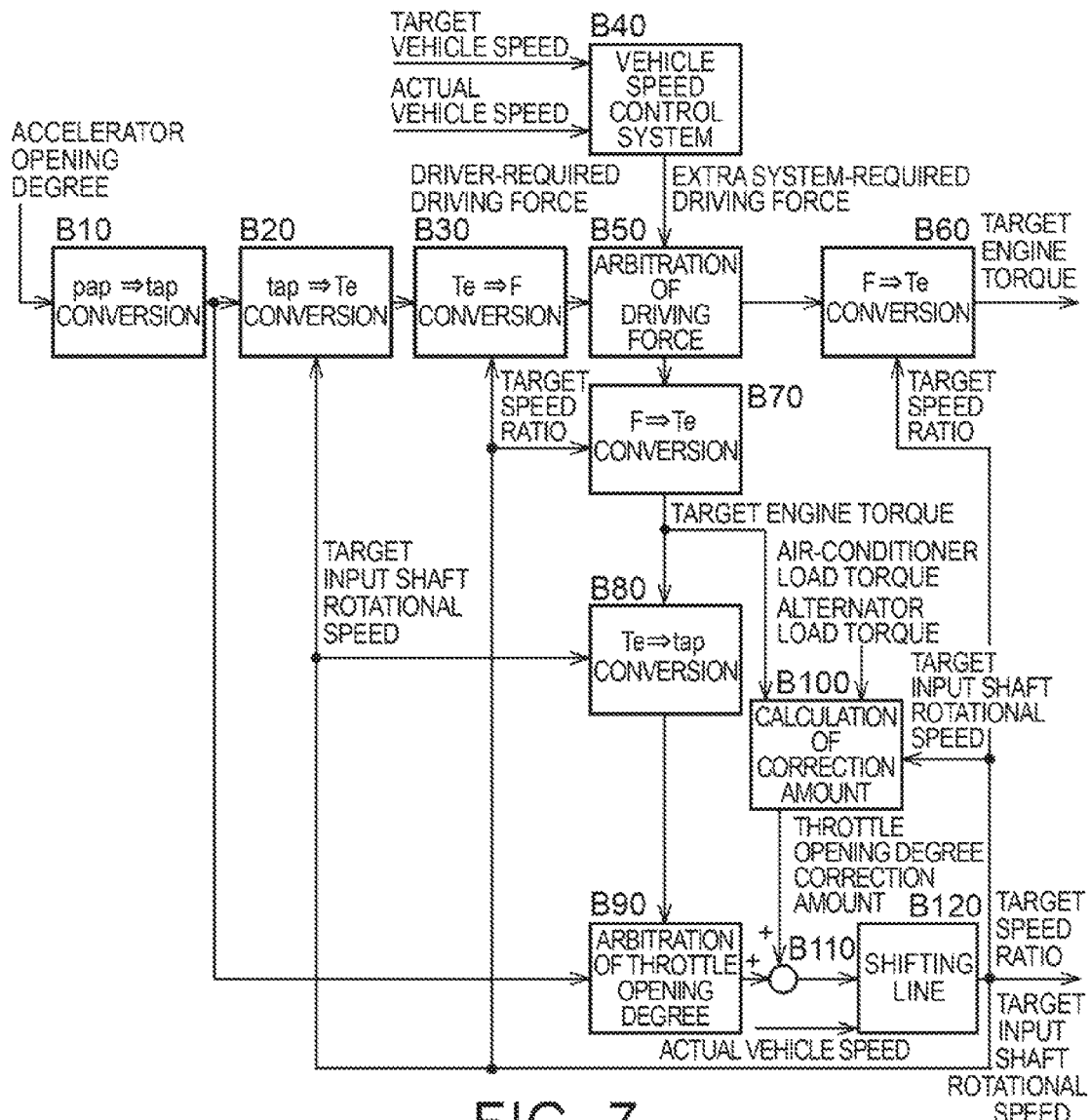
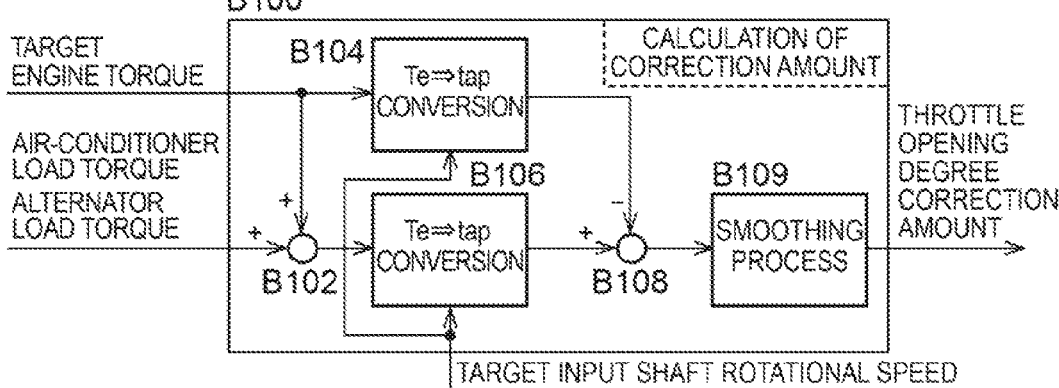

CONTROL APPARATUS FOR VEHICLE

INCORPORATION BY REFERENCE

The disclosure of Japanese Patent Application No. 2015-029091 filed on Feb. 17, 2015 including the specification, drawings and abstract is incorporated herein by reference in its entirety.

BACKGROUND OF THE INVENTION

1. Field of the Invention

The invention relates to a control apparatus for a vehicle that corrects the required output amount for use in shifting control of a continuously variable transmission, in accordance with the load torque resulting from auxiliaries.

2. Description of Related Art

A control apparatus for a vehicle that is equipped with an engine, auxiliaries that operate by a motive power of the engine, and a continuously variable transmission that transmits the motive power of the engine to driving wheel sides is well known. This control apparatus corrects a required output amount for use in shifting control of the continuously variable transmission (hereinafter referred to also as a required output amount for shifting control) in accordance with a load torque resulting from the auxiliaries (hereinafter referred to also as an auxiliary load torque). For example, Japanese Patent Application Publication No. 2010-247623 (JP 2010-247623 A) describes such a control apparatus for a vehicle. This Japanese Patent Application Publication No. 2010-247623 (JP 2010-247623 A) discloses that a value corresponding to the auxiliary load torque is converted into a correction value of a depression amount of an accelerator pedal, and that a value obtained by adding the correction value to an actual depression amount is calculated as a required amount that is used to control each of the engine and the continuously variable transmission.

SUMMARY OF THE INVENTION

When the target speed ratio and the target engine torque change due to changes in the required output amount for speed ratio control resulting from the auxiliary load torque, the engine rotational speed may be changed. Therefore, when the engine rotational speed changes due to changes in the auxiliary load torque under the circumstances where a driver has not operated the accelerator pedal, the driver may develop a feeling of strangeness. In contrast, it is conceivable to execute a smoothing process of changes in the required output amount for speed ratio control resulting from the auxiliary load torque. However, when changes in the engine rotational speed are made gentle through the smoothing process in performing shifting control of the continuously variable transmission such that the operating point of the engine follows an optimal fuel economy line, the movement of the operating point of the engine onto the optimal fuel economy line may be retarded to cause a deterioration in fuel economy. Incidentally, the problems as described above are unknown.

The invention provides a control apparatus for a vehicle that can reduce a feeling of strangeness developed by a driver and suppress a deterioration in fuel economy, in correcting a required output amount for use in shifting control of a continuously variable transmission, in accordance with an auxiliary load torque.

In a first aspect of the invention, there is provided a control apparatus for a vehicle. The vehicle includes an engine, an auxiliary that is configured to operate by a motive power of the engine, and a continuously variable transmission that is configured to transmit the motive power of the engine to a driving wheel. The control apparatus includes an electronic control unit that is configured to (a) perform shifting control of the continuously variable transmission such that an operating point of the engine follows an optimal fuel economy line, and (b) correct a required output amount that is used for shifting control of the continuously variable transmission and that is based on an operation by a driver, in accordance with a load torque resulting from the auxiliary, such that (i) a smoothing process of changes in the required output amount is executed when the required output amount is increased, and that (ii) the smoothing process is not executed when the required output amount is reduced.

In a second aspect of the invention, there is provided a control apparatus for a vehicle. The vehicle includes an engine, an auxiliary that is configured to operate by a motive power of the engine, and a continuously variable transmission that is configured to transmit the motive power of the engine to a driving wheel. The control apparatus includes an electronic control unit that is configured to (a) perform shifting control of the continuously variable transmission such that an operating point of the engine follows an optimal fuel economy line, and (b) correct a required output amount that is used for shifting control of the continuously variable transmission and that realizes a required driving force resulting from automatic vehicle speed control for assisting a driver in driving, in accordance with a load torque resulting from the auxiliary, such that (i) a smoothing process of changes in the required output amount is executed when the required output amount is increased, and that (ii) the smoothing process is not executed when the required output amount is reduced.

In this manner, the engine can be operated at an operating point with good fuel economy even when the auxiliary is driven, by calculating the required output amount for speed ratio control in consideration of the auxiliary load torque. In correcting the required output amount for speed ratio control in accordance with the auxiliary load torque, when the required output amount for speed ratio control is corrected in such a manner as to increase from its last value, namely, such that an engine rotational speed rises, the engine rotational speed does not suddenly change due to the smoothing process of changes in the required output amount for speed ratio control. Therefore, the feeling of strangeness developed by the driver can be reduced. Besides, the correction that is made in such a manner that the engine rotational speed falls does not lead to a feeling of acceleration, and is unlikely to make the driver develop a feeling of strangeness. Therefore, when the required output amount for speed ratio control is corrected in such a manner as to decrease from its last value, the smoothing process of changes in the required output amount for speed ratio control is not executed. Thus, the operating point of the engine can be changed at an early stage, and the deterioration in fuel economy can be suppressed.

In each of the aforementioned aspects of the invention, the smoothing process is a filtering process for retarding changes in a correction amount of the required output amount corresponding to the load torque resulting from the auxiliary, or a guarding process for limiting changes in the correction amount to a predetermined change amount. In this manner, the smoothing process of changes in the required output amount for speed ratio control can be appropriately executed.

In each of the aforementioned aspects of the invention, a required driving force corresponding to the required output amount based on an operation by the driver or a required driving force resulting from the automatic vehicle speed control is calculated. A target engine torque that realizes the required driving force is calculated. The correction amount of the required output amount for use in shifting control of the continuously variable transmission is calculated based on the target engine torque and the load torque resulting from the auxiliary. A post-correction required output amount for use in shifting control of the continuously variable transmission is calculated by adding the correction amount to the required output amount based on the operation by the driver or a required output amount from which the target engine torque is obtained. In this manner, the engine can be operated at an operating point with good fuel economy even when the auxiliary is driven, in the control apparatus for the vehicle that performs engine torque control and shifting control based on the required driving force corresponding to the required output amount based on the operation by the driver or a required driving force different therefrom (e.g., based on the required driving force after arbitration of the required driving force corresponding to the required output amount and the required driving force different therefrom). In this case, the feeling of strangeness developed by the driver can be reduced, and the deterioration in fuel economy can be suppressed.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 6 is a block diagram illustrating the essence of a control operation of an electronic control unit, namely, the control operation for reducing a feeling of strangeness developed by a driver and suppressing a deterioration in fuel economy in correcting a throttle opening degree for speed ratio control in accordance with an auxiliary load torque; and FIG. 7 is a sub-block diagram illustrating the contents of a block for calculating a throttle opening degree correction amount in a flowchart of FIG. 6.

DETAILED DESCRIPTION OF EMBODIMENT

The embodiment of the invention will be described hereinafter in detail with reference to the drawings.

Figure 1:
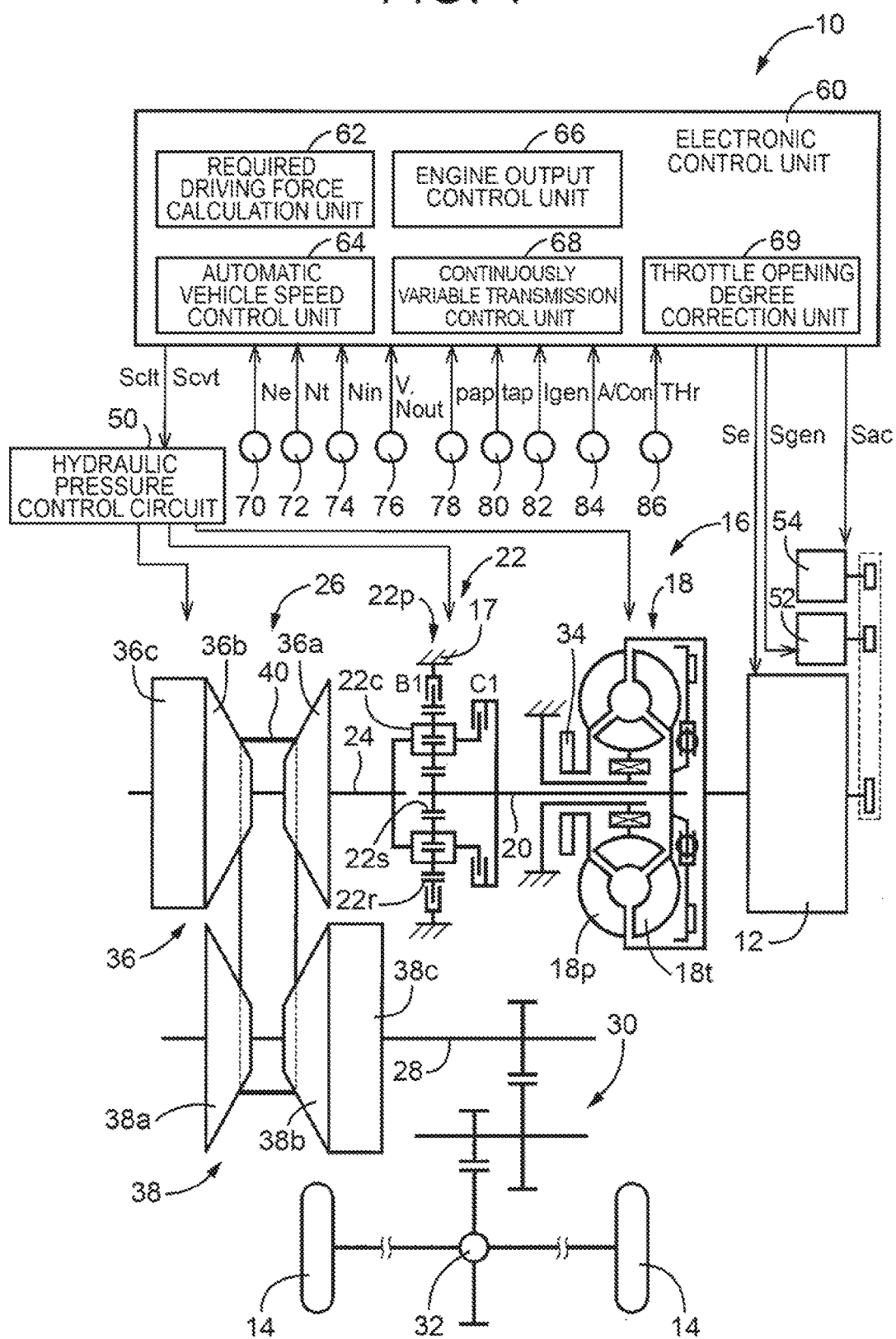
FIG. 1 is a view illustrating the general configuration of a vehicle to which the invention is applied, and is a view illustrating the essence of control functions and control systems for various kinds of control in the vehicle.

FIG. 1 is a view illustrating the general configuration of a vehicle 10 to which the invention is applied, and is a view illustrating the essence of control functions and control systems for various kinds of control in the vehicle 10. In FIG. 1, the vehicle 10 is equipped with an engine 12 as a driving force source for running, driving wheels 14, and a motive power transmission device 16 that is provided between the engine 12 and the driving wheels 14. In a housing 17 as a non-rotary member, the motive power transmission device 16 is equipped with a known torque converter 18 as a hydraulic power transmission that is coupled to the engine 12, a turbine shaft 20 that is coupled to the torque converter 18, a forward/backward changeover device 22 that is coupled to the turbine shaft 20, an input shaft 24 that is coupled to the forward/backward changeover device 22, a continuously variable transmission 26 that is coupled to the input shaft 24, an output shaft 28 that is coupled to the continuously variable transmission 26, a reduction gear device 30, a differential gear device 32, and the like. In the motive power transmission device 16 thus configured, a motive power of the engine 12 (a torque and a force are also equivalent in meaning when no distinction is made therefrom in particular) is transmitted to the right and left driving wheels 14 sequentially via the torque converter 18, the forward/backward changeover device 22, the continuously variable transmission 26, the reduction gear device 30, the differential gear device 32 and the like.

The torque converter 18 is equipped with a pump impeller 18$p$ that is coupled to the engine 12, and a turbine impeller 18$t$ that is coupled to the turbine shaft 20. A mechanical oil pump 34 is coupled to the pump impeller 18$p$. By being rotationally driven by the engine 12, the mechanical oil pump 34 generates a hydraulic oil pressure for performing shifting control of the continuously variable transmission 26, generating a belt clamping force in the continuously variable transmission 26, making a changeover in operation of each of a forward clutch C1 and a backward brake B1, which will be described later, and supplying lubricating oil to respective portions of the motive power transmission device 16.

The forward/backward changeover device 22 is equipped with a double pinion-type planetary gear device 22$p$, the forward clutch C1, and the backward brake B1. A sun gear 22$s$ of the planetary gear device 22$p$ is coupled to the turbine shaft 20. A carrier 22$c$ of the planetary gear device 22$p$ is coupled to the input shaft 24. A ring gear 22$r$ of the planetary gear device 22$p$ is selectively coupled to the housing 17 via the backward brake B1. Besides, the carrier 22$c$ and the sun gear 22$s$ are selectively coupled to each other via the forward clutch C1. The forward clutch C1 and the backward brake B1 are known hydraulic frictional engagement devices. In the forward/backward changeover device 22 thus configured, when the forward clutch C1 is engaged and the backward brake B1 is released, a forward motive power transmission path is formed. Besides, when the backward brake B1 is engaged and the forward clutch C1 is released, a backward motive power transmission path is formed. Besides, when both the forward clutch C1 and the backward brake B1 are released, the forward/backward changeover device 22 assumes a neutral state in which the transmission of a motive power is shut off (a motive power transmission shutoff state).

The continuously variable transmission 26 is equipped with a primary pulley 36 that is provided on the input shaft 24 and that has a variable effective diameter, a secondary pulley 38 that is provided on the output shaft 28 and that has a variable effective diameter, and a transmission belt 40 as a transmission element that is wound between those respective pulleys 36 and 38. The continuously variable transmission 26 transmits a motive power of the engine 12 to the driving wheel 14 sides via a frictional force between those respective pulleys 36 and 38 and the transmission belt 40.

The primary pulley 36 is equipped with a stationary sheave 36a that is fixed to the input shaft 24, a movable sheave 36b that is provided relatively unrotatably around an axis of the input shaft 24 and movably in an axial direction thereof, and a hydraulic cylinder 36c as a hydraulic actuator that applies a primary thrust force Win (=a primary pressure Pin×a pressure-receiving area Ain) in the primary pulley 36 to change the width of a V-groove between those respective sheaves 36a and 36b. Besides, the secondary pulley 38 is equipped with a stationary sheave 38a that is fixed to the output shaft 28, a movable sheave 38b that is provided relatively unrotatably around an axis of the output shaft 28 and movably in an axial direction thereof, and a hydraulic cylinder 38c as a hydraulic actuator that applies a secondary thrust force Wout (=a secondary pressure Pout×a pressure-receiving area Aout) in the secondary pulley 38 to change the width of a V-groove between those respective sheaves 38a and 38b. The primary pressure Pin is a hydraulic pressure that is supplied to the hydraulic cylinder 36c, and the secondary pressure Pout is a hydraulic pressure that is supplied to the hydraulic cylinder 38c. The respective hydraulic pressures Pin and Pout are pulley hydraulic pressures that apply the thrust forces Win and Wout for pressing the movable sheaves 36b and 38b against the stationary sheave 36a and 38a sides respectively.

In the continuously variable transmission 26, the primary pressure Pin and the secondary pressure Pout are controlled to be regulated by a hydraulic pressure control circuit 50 with which the vehicle 10 is equipped, and the primary thrust force Win and the secondary thrust force Wout are thereby controlled respectively. Thus, the widths of the V-grooves of the respective pulleys 36 and 38 change, and the hanging diameter (the effective diameter) of the transmission belt 40 is changed. A speed ratio (a gear ratio) γ (=an input shaft rotational speed Nin/an output shaft rotational speed Nout) is changed, and the frictional force (i.e., the clamping force, which will be referred to hereinafter as the belt clamping force) between the respective pulleys 36 and 38 and the transmission belt 40 is controlled such that the transmission belt 40 does not slip. That is, each of the primary pressure Pin (which is the same in meaning as the primary thrust force Win) and the secondary pressure Pout (which is the same in meaning as the secondary thrust force Wout) is controlled, so the actual speed ratio γ is made equal to a target speed ratio γtgt while the transmission belt 40 is prevented from slipping.

The vehicle 10 is further equipped with auxiliaries that operate by a motive power of the engine 12, and an electronic control unit (an ECU) 60 as a control apparatus for the vehicle 10. The aforementioned auxiliaries are, for example, an alternator 52 that is coupled to the engine 12 via a belt or the like, an air-conditioner compressor 54 that is coupled to the engine 12 via a belt, an electromagnetic clutch (not shown) etc., and the like, and are driven by the engine 12 respectively. While the alternator 52 generates electric power, a load resulting from the operation of the alternator 52 is generated in the engine 12. While the aforementioned electromagnetic clutch is engaged, a load resulting from the operation of the air-conditioner compressor 54 is generated in the engine 12.

The electronic control unit 60 is configured to include, for example, a so-called microcomputer that is equipped with a CPU, a RAM, a ROM, input/output interfaces and the like. The CPU performs various kinds of control of the vehicle 10 by executing a signal process in accordance with a program stored in advance in the ROM while utilizing a temporary storage function of the RAM. For example, the electronic control unit 60 performs shifting control including output control of the engine 12, belt clamping force control of the continuously variable transmission 26, and the like, and is configured separately for engine control, hydraulic pressure control and the like as needed.

Various actual values (e.g., an engine rotational speed Ne, a turbine rotational speed Nt as a rotational speed of the turbine shaft 20, the input shaft rotational speed Nin, the output shaft rotational speed Nout corresponding to a vehicle speed V, an accelerator opening degree ρap as an operation amount of an accelerator operating member (e.g., a known accelerator pedal), a throttle opening degree tap as an opening angle (or an opening amount) of an electronic throttle valve that is provided in an intake pipe of the engine 12, an electric power generation current Igen of the alternator 52, an air-conditioner on signal A/Con indicating that the air-conditioner compressor 54 is in operation, a room temperature THr indicating an air temperature in a vehicle interior, and the like) based on detection signals of various sensors (e.g., various rotational speed sensors 70, 72, 74 and 76, an accelerator opening degree sensor 78, a throttle opening degree sensor 80, a current sensor 82, an air-conditioner switch 84 for driving an air-conditioner, an inside air sensor 86 and the like) with which the vehicle 10 is equipped are supplied to the electronic control unit 60.

Besides, various output signals (e.g., an engine output control command signal Se for output control of the engine 12, a hydraulic pressure control command signal Scvt for hydraulic pressure control regarding the shifting and the like of the continuously variable transmission 26, a hydraulic pressure control command signal Sclt for hydraulic pressure control regarding engagement operation of the forward clutch C1 and the backward brake B1, an electric power generation voltage command signal Sgen for controlling the electric power generation state of the alternator 52, an air-conditioner control command signal Sac for driving the air-conditioner compressor 54 with the electromagnetic clutch engaged and controlling the capacity of the air-conditioner compressor 54 based on the room temperature THr or the like, and the like) are supplied from the electronic control unit 60 to the respective devices (e.g., the engine 12, the hydraulic pressure control circuit 50, the alternator 52, the air-conditioner compressor 54, the electromagnetic clutch and the like) that are provided in the vehicle 10.

The accelerator opening degree ρap indicates an output (a driving force) that is required of the vehicle 10 (or the engine 12) by the driver. That is, the accelerator opening degree ρap is an amount of the output that is required of the vehicle 10 (or the engine 12) by the driver, namely, a required output amount based on an operation by the driver. Besides, the throttle opening degree tap is an opening angle of the electronic throttle valve 56 that is operated in realizing the output of the engine 12 corresponding to the accelerator opening degree ρap, and can be regarded as a required output amount based on an operation by the driver. In the present embodiment of the invention, this throttle opening degree tap is referred to as a driver-required throttle opening degree tapd. Besides, as will be described later, the electronic control unit 60 calculates the target speed ratio γtgt of the continuously variable transmission 26 based on a required output amount for use in shifting control of the continuously variable transmission 26 (i.e., a required output amount for speed ratio control). This required output amount for speed ratio control is a pseudo required output amount that is obtained through calculation. Although the throttle opening degree tap is used as a required output amount in the present embodiment of the invention, it goes without saying that the throttle opening degree tap can be replaced with the accelerator opening degree pap. Accordingly, in the present embodiment of the invention, a throttle opening degree tapsh for speed ratio control is exemplified as a required output amount for speed ratio control, but an accelerator opening degree papsh for speed ratio control may be used instead.

The electronic control unit 60 is equipped with required driving force calculation means, namely, a required driving force calculation unit 62, automatic vehicle speed control means, namely, an automatic vehicle speed control unit 64, engine output control means, namely, an engine output control unit 66, and continuously variable transmission control means, namely, a continuously variable transmission control unit 68.

Figure 2:
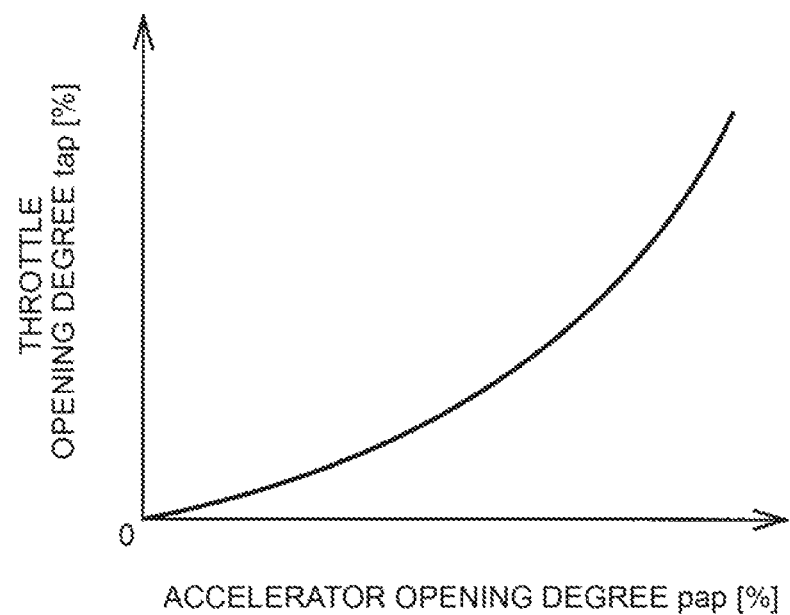
FIG. 2 is a view showing an exemplary throttle opening degree map that is determined in advance.

The required driving force calculation unit 62 converts the accelerator opening degree pap into the driver-required throttle opening degree tapd. The required driving force calculation unit 62 calculates the driver-required throttle opening degree tapd by applying the actual accelerator opening degree pap to, for example, a throttle opening degree map as shown in FIG. 2, which is obtained experimentally or in a design-based manner and stored in advance (i.e., which is determined in advance).

Figure 3:
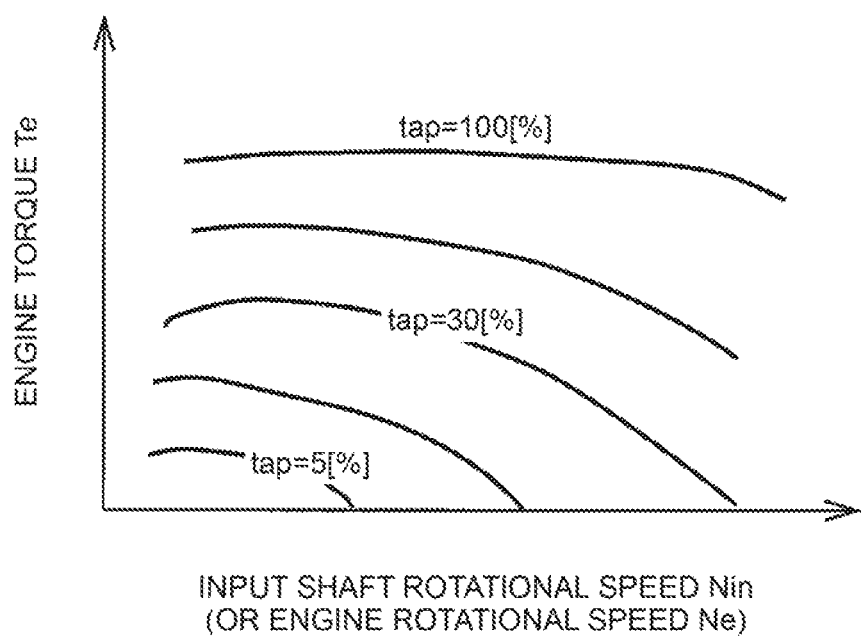
FIG. 3 is a view showing an exemplary engine torque map that is determined in advance.

The required driving force calculation unit 62 converts the driver-required throttle opening degree tapd into a driver-required engine torque Ted. The required driving force calculation unit 62 calculates the driver-required engine torque Ted by applying the driver-required throttle opening degree tapd and a target input shaft rotational speed Nintgt of the continuously variable transmission 26 (or the engine rotational speed Ne converted from the target input shaft rotational speed Nintgt) to, for example, an engine torque map that is determined in advance as shown in FIG. 3. The aforementioned engine torque map is a relationship that is determined in advance among the engine torque Te, the input shaft rotational speed Nin (or the engine rotational speed Ne) and the throttle opening degree tap. Incidentally, when the vehicle runs forward, the turbine rotational speed Nt and the input shaft rotational speed Nin coincide with each other due to engagement of the forward clutch C1. Therefore, the relationship between the engine rotational speed Ne and the input shaft rotational speed Nin is expressed as (Ne=Nin÷e; e is a speed ratio of the torque converter 18). Accordingly, the engine rotational speed Ne and the input shaft rotational speed Nin can be replaced with each other. Besides, when a lockup clutch that is provided in the torque converter 18 is engaged, the turbine rotational speed Nr (the input shaft rotational speed Nin) and the engine rotational speed Ne coincide with each other.

The required driving force calculation unit 62 converts the driver-required engine torque Ted into a driver-required driving force Fdemd. The required driving force calculation unit 62 calculates the driver-required driving force Fdemd through the use of, for example, the following equation (1). In the following equation (1), t is a torque ratio of the torque converter 18 (=a turbine torque Tt/a pump torque Tp), γtgt is the target speed ratio γtgt of the continuously variable transmission 26, i is a speed reduction ratio of the reduction gear device 30, the differential gear device 32 or the like, and rw is a tire effective diameter of the driving wheels 14. In this manner, the required driving force calculation unit 62 calculates the driver-required driving force Fdemd, which is a required driving force Fdem corresponding to the accelerator opening degree pap (or the driver-required throttle opening degree tapd). Incidentally, the torque ratio t is a function of the speed ratio e of the torque converter 18 (=the turbine rotational speed Nt/a pump rotational speed Np (i.e., the engine rotational speed Ne)), and is calculated by applying the actual speed ratio e to a relationship (a map) that is determined in advance between the speed ratio e and the torque ratio t.

$$Fdemd = Ted \times t \times \gamma tgt \times i \div rw \qquad (1)$$

The automatic vehicle speed control unit 64 calculates an extra system-required driving force Fdemv for use in automatic vehicle speed control for controlling the actual vehicle speed V regardless of the accelerator opening degree pap. The automatic vehicle speed control unit 64 calculates the extra system-required driving force Fdemv for controlling the vehicle speed V, based on a target vehicle speed Vtgt set by the driver. The aforementioned automatic vehicle speed control is, for example, known cruise control for controlling a driving force F such that the vehicle speed V follows the target vehicle speed Vtgt set by the driver. Besides, the aforementioned automatic vehicle speed control is, for example, known automatic vehicle speed limit control (adjustable speed limiter (ASL)) for controlling the driving force F such that the vehicle speed V does not exceed the target vehicle speed Vtgt set by the driver (i.e., the driving force F is guarded so as not to exceed its upper limit). In this manner, the automatic vehicle speed control unit 64 calculates the extra system-required driving force Fdemv, which is the required driving force Fdem resulting from automatic vehicle speed control for assisting the driver in driving. The electronic control unit 60 sets the extra system-required driving force Fdemv regardless of the accelerator opening degree pap, and performs driving force control (automatic vehicle speed control) based on the extra system-required driving force Fdemv.

The required driving force calculation unit 62 selects which required driving force Fdem should be given higher priority, that is, whether the driver-required driving force Fdemd or the extra system-required driving force Fdemv should be given higher priority, according to a driving force arbitration procedure that is determined in advance, and sets this selected required driving force Fdem as a post-arbitration required driving force Fdema. The aforementioned driving force arbitration procedure is designed, for example, to select the larger one of the driver-required driving force Fdemd and the extra system-required driving force Fdemv resulting from cruise control. Besides, the aforementioned driving force arbitration procedure is designed, for example, to select the smaller one of the driver-required driving force Fdemd and the extra system-required driving force Fdemv resulting from ASL.

The engine output control unit 66 calculates a target engine torque Tetgt for realizing the post-arbitration required driving force Fdema through the use of, for example, the following equation (2). In the following equation (2), rw, γtgt, i and t are the same as in the foregoing equation (1).

$$Tetgt = (Fdema \times rw) \div (\gamma tgt \times i \times t) \qquad (2)$$

The engine output control unit 66 calculates a target throttle opening degree taptgt from which the target engine torque Tetgt is obtained. The engine output control unit 66 calculates the target throttle opening degree taptgt by applying the target engine torque Tetgt and the target input shaft rotational speed Nintgt of the continuously variable transmission 26 (or the engine rotational speed Ne converted from the target input shaft rotational speed Nintgt) to, for example, an engine torque map that is determined in advance as shown in FIG. 3. The engine output control 66 outputs an engine output control command signal Se for making the actual throttle opening degree tap equal to the target throttle opening degree taptgt to a throttle actuator, such that the target engine torque Tetgt is obtained. In addition, the engine output control unit 66 outputs engine output control command signals Se such as an injection signal, an ignition timing signal and the like to a fuel injection device and an ignition device respectively, such that the target engine torque Tetgt is obtained.

Figure 4:
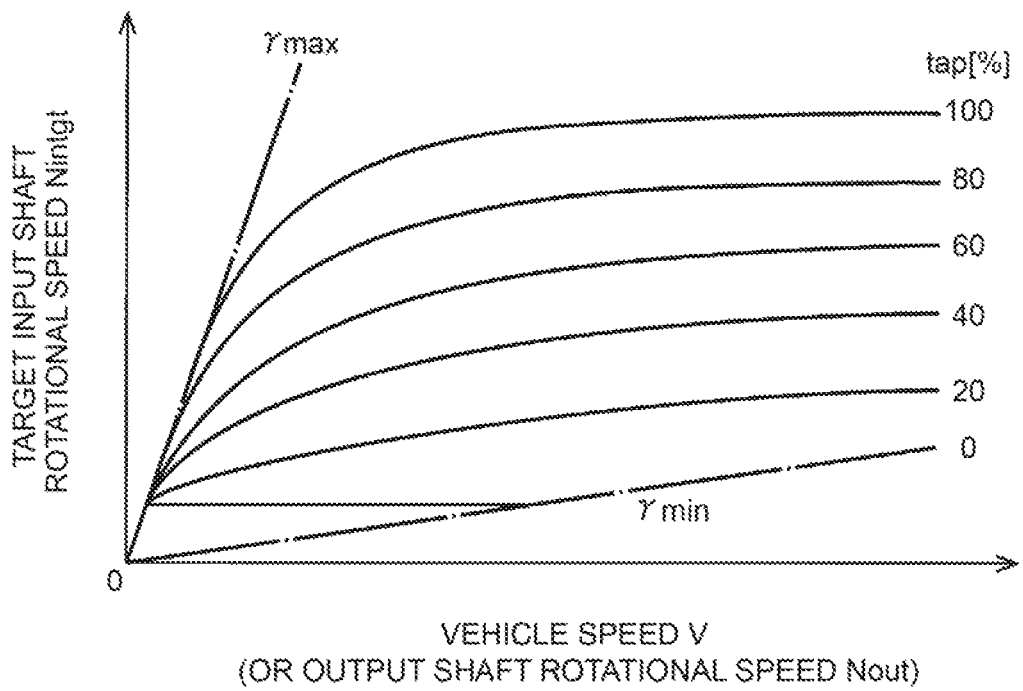
FIG. 4 is a view showing an exemplary shifting map that is determined in advance.
Figure 5:
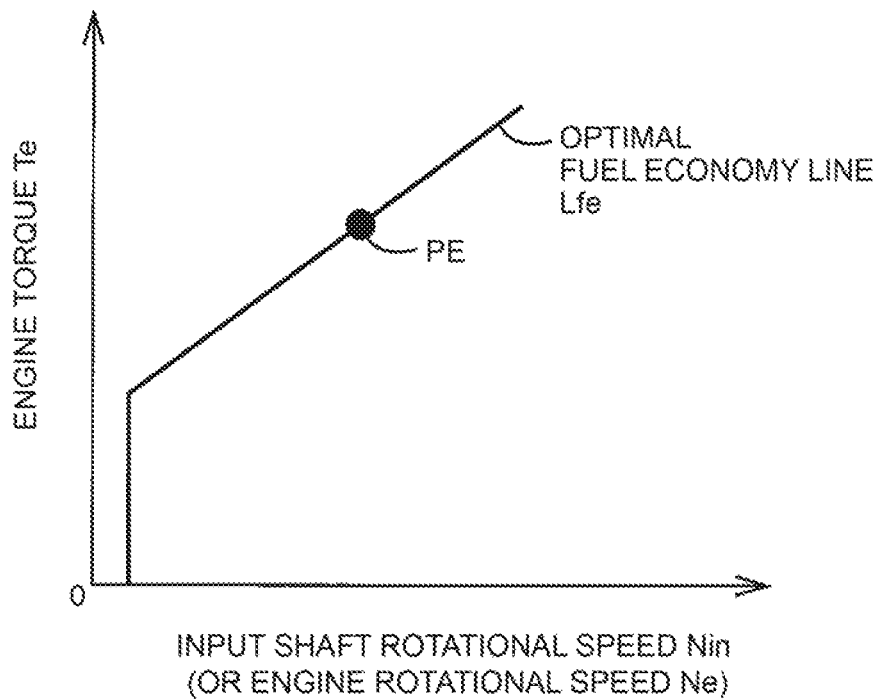
FIG. 5 is a view showing an exemplary optimal fuel economy line that is determined in advance.

The continuously variable transmission control unit 68 calculates the target speed ratio γtgt of the continuously variable transmission 26 based on the throttle opening degree tapsh for speed ratio control. The continuously variable transmission control unit 68 calculates the target input shaft rotational speed Nintgt by applying the vehicle speed V (or the output shaft rotational speed Nout) and the throttle opening degree tapsh for speed ratio control to, for example, a shifting map that is determined in advance as shown in FIG. 4. The continuously variable transmission control unit 68 calculates the target speed ratio γtgt (=Nintgt/Nout) based on this target input shaft rotational speed Nintgt. The shifting map in FIG. 4 is a relationship that is determined in advance between the vehicle speed V (or the output shaft rotational speed Nout) and the target input shaft rotational speed Nintgt, with the throttle opening degree tap used as a parameter. This shifting map is equivalent to a shifting condition for making operability (dynamic performance) and fuel economy (fuel-saving performance) compatible with each other, and is determined in advance, for example, such that the target input shaft rotational speed Nintgt for causing an engine operating point PE to follow an optimal fuel economy line Lfe of the engine 12 is set. Accordingly, the continuously variable transmission control unit 68 performs shifting control of the continuously variable transmission 26 in such a manner as to cause the engine operating point PE to follow the optimal fuel economy line Lfe. The aforementioned engine operating point PE is an operating point of the engine 12 (an operation point) that is determined by the engine rotational speed Ne and the engine torque Te. The aforementioned optimal fuel economy line Lfe is a known relationship (a fuel economy map) that is determined in advance in such a manner as to make operability and fuel economy compatible with each other in a two-dimensional coordinate system that is constituted of the target input shaft rotational speed Nintgt (or the engine rotational speed Ne) and the engine torque Te (see FIG. 5).

When the result of selection (i.e., the result of arbitration) by the required driving force calculation unit 62 is the driver-required driving force Fdemd, the continuously variable transmission control unit 68 sets the driver-required throttle opening degree tapd to the throttle opening degree tapsh for speed ratio control. On the other hand, when the result of selection by the required driving force calculation unit 62 is the extra system-required driving force Fdemv, the continuously variable transmission control unit 68 sets a fictive throttle opening degree (a virtual throttle opening degree) tapi from which the target engine torque Tetgt is obtained, to the throttle opening degree tapsh for speed ratio control. The continuously variable transmission control unit 68 calculates the virtual throttle opening degree tapi by applying the target engine torque Tetgt and the target input shaft rotational speed Nintgt (or the engine rotational speed Ne converted from the target input shaft rotational speed Nintgt) to, for example, an engine torque map that is determined in advance as shown in FIG. 3. In this manner, the continuously variable transmission control unit 68 executes throttle opening degree arbitration for selecting (setting) one of the driver-required throttle opening degree tapd and the virtual throttle opening degree tapi as the throttle opening degree tapsh for speed ratio control based on the result of selection by the required driving force calculation unit 62. When the result of selection by the required driving force calculation unit 62 is the driver-required driving force Fdemd, the continuously variable transmission control unit 68 calculates the target speed ratio γtgt of the continuously variable transmission 26 based on the driver-required throttle opening degree tapd. On the other hand, when the result of determination by the required driving force calculation unit 62 is the extra system-required driving force Fdemv, the continuously variable transmission control unit 68 calculates the target speed ratio γtgt of the continuously variable transmission 26 based on the virtual throttle opening degree tapi.

The continuously variable transmission control unit 68 determines a target value of the primary pressure Pin (hereinafter referred to as a target primary pressure Pintgt) and a target value of the secondary pressure Pout (hereinafter referred to as a target secondary pressure Pouttgt), for example, in such a manner as to achieve the target speed ratio γtgt of the continuously variable transmission 26 while preventing the belt of the continuously variable transmission 26 from slipping, and outputs hydraulic pressure control command signals Scvt, which correspond to the target primary pressure Pintgt and the target secondary pressure Pouttgt respectively, to the hydraulic pressure control circuit 50.

It should be noted herein that the electronic control unit 60 is further equipped with throttle opening degree correction means, namely, a throttle opening degree correction unit 69 that corrects the throttle opening degree tapsh for speed ratio control in accordance with a load torque (an auxiliary load torque) Taux resulting from the auxiliaries (the alternator 52, the air-conditioner compressor 54 and the like). This auxiliary load torque Taux is a value corresponding to the engine torque Te that is added to the target engine torque Tetgt to realize the post-arbitration required driving force Fdema.

The throttle opening degree correction unit 69 calculates a correction amount (a throttle opening degree correction amount) Δtap of the throttle opening degree tapsh for speed ratio control, based on the target engine torque Tetgt and the auxiliary load torque Taux. That is, the throttle opening degree correction unit 69 calculates the throttle opening degree correction amount Δtap corresponding to the auxiliary load torque Taux.

In concrete terms, the throttle opening degree correction unit 69 calculates a load torque Talt resulting from the alternator 52 by applying the electric power generation voltage command signal Sgen and the electric power generation current Igen of the alternator 52 or the like to, for example, a relationship that is determined in advance. The throttle opening degree correction unit 69 calculates an operating capacity of the air-conditioner compressor 54 by applying the air-conditioner control command signal Sac to, for example, a relationship that is determined in advance, and calculates the load torque Tac resulting from the air-conditioner compressor 54 by applying the operating capacity of the air-conditioner compressor 54 or the like to a relationship that is determined in advance. The throttle opening degree correction unit 69 calculates the auxiliary load torque Taux by summating the load torque Talt resulting from the alternator 52, the load torque Tac resulting from the air-conditioner compressor 54, and the like. The throttle opening degree correction unit 69 calculates a load-added engine torque Tea (=Tetgt+Taux) by summating the target engine torque Tetgt and the auxiliary load torque Taux. The throttle opening degree correction unit 69 calculates a base throttle opening degree (a basic throttle opening degree) tapb by applying the target engine torque Tetgt and the target input shaft rotational speed Nintgt of the continuously variable transmission 26 (or the engine rotational speed Ne converted from the target input shaft rotational speed Nintgt) to, for example, an engine torque map that is determined in advance as shown in FIG. 3. The throttle opening degree correction unit 69 calculates a throttle opening degree (a load-added throttle opening degree) tapea to which a value corresponding to the auxiliary load torque Taux is added, by applying the load-added engine torque Tea and the target input shaft rotational speed Nintgt of the continuously variable transmission 26 (or the engine rotational speed Ne converted from the target input shaft rotational speed Nintgt) to, for example, an engine torque map that is determined in advance as shown in FIG. 3. The throttle opening degree correction unit 69 calculates a throttle opening degree correction amount Δtap (=tapea−tapb) by subtracting the basic throttle opening degree tapb from the load-added throttle opening degree tapea.

The throttle opening degree correction unit 69 calculates a throttle opening degree for speed ratio control after correction (a post-correction throttle opening degree for speed ratio control) tapshc (=tapsh+Δtap) by adding the throttle opening degree correction amount Δtap to the throttle opening degree tapsh for speed ratio control (the driver-required throttle opening degree tapd or the virtual throttle opening degree tapi). Accordingly, the continuously variable transmission control unit 68 actually calculates the target speed ratio γtgt of the continuously variable transmission 26 based on the post-correction throttle opening degree tapshc for speed ratio control.

By the way, the post-correction throttle opening degree tapshc for speed ratio control changes as the throttle opening degree correction amount Δtap changes. Therefore, the target input shaft rotational speed Nintgt and the target speed ratio γtgt change, and the engine operating point PE also changes. Then, even though the driver has not operated the accelerator pedal, the engine rotational speed Ne may change due to changes in the throttle opening degree correction amount Δtap, and the driver may develop a feeling of strangeness. In contrast, according to the present embodiment of the invention, the throttle opening degree correction unit 69 executes a smoothing process for smoothing changes in the throttle opening degree correction amount Δtap. It should be noted, however, that the driver is considered to be likely to develop a feeling of strangeness when the engine rotational speed Ne rises, and unlikely to develop a feeling of strangeness when the engine rotational speed Ne falls. Besides, the movement of the engine operating point PE onto the optimal fuel economy line Lfe may be retarded by the smoothing process. Therefore, it is desirable that the smoothing process be executed to make it unlikely for the driver to develop a feeling of strangeness when the engine rotational speed Ne rises. On the contrary, it is desirable that the smoothing process not be executed to prevent the movement of the engine operating point PE onto the optimal fuel economy line Lfe from being retarded.

Thus, the throttle opening degree correction unit 69 executes the smoothing process of changes in the post-correction throttle opening degree tapshc for speed ratio control (i.e., the smoothing process of changes in the throttle opening degree correction amount Δtap) in the case where the correction corresponding to the auxiliary load torque Taux increases the post-correction throttle opening degree tapshc for speed ratio control beyond its last value (i.e., in the case where the throttle opening degree correction amount Δtap changes in such a manner as to increase beyond its last value). On the other hand, the throttle opening degree correction unit 69 does not execute the aforementioned smoothing process in the case where the correction corresponding to the auxiliary load torque Taux reduces the post-correction throttle opening degree tapshc for speed ratio control below its last value (i.e., in the case where the throttle opening degree correction amount Δtap changes in such a manner as to decrease below its last value).

The smoothing process is, for example, a filtering process (e.g., a filtering process by a low-pass filter) for retarding changes in the throttle opening degree correction amount Δtap. Alternatively, the smoothing process is, for example, a guarding process for limiting changes in the throttle opening degree correction amount Δtap to a predetermined change amount (i.e., a guarding process for setting the upper limit of the amount of change in the throttle opening degree correction amount Δtap from its last value to the predetermined change amount). A filter coefficient in the aforementioned filtering process and the predetermined change amount are determined in advance as, for example, values that make the driver unlikely to develop a feeling of strangeness due to a rise in the engine rotational speed Ne and that do not suppress changes in the engine operating point PE too much.

FIG. 6 is a block diagram illustrating the essence of the control operation of the electronic control unit 60, namely, the control operation for reducing the feeling of strangeness developed by the driver and suppressing the deterioration in fuel economy in correcting the throttle opening degree tapsh for speed ratio control in accordance with the auxiliary load torque Taux. FIG. 6 is equivalent to a flowchart showing the control operation, and is executed, for example, repeatedly. Besides, FIG. 7 is a sub-block diagram illustrating the contents of the block of calculating the throttle opening degree correction amount Δtap in the flowchart of FIG. 6.

In FIG. 6, in a block (the word "block" will be omitted hereinafter) B10 corresponding to the required driving force calculation unit 62, the accelerator opening degree pap is converted into the driver-required throttle opening degree tapd through the use of the throttle opening degree map shown in FIG. 2. Then in B20 corresponding to the required driving force calculation unit 62, the driver-required engine torque Ted is calculated by applying the driver-required throttle opening degree tapd and the target input shaft rotational speed Nintgt (or the engine rotational speed Ne converted from the target input shaft rotational speed Nintgt) to the engine torque map shown in FIG. 3. Then in B30 corresponding to the required driving force calculation unit 62, the driver-required engine torque Ted is converted into the driver-required driving force Fdemd through the use of the equation (1). In parallel with the execution of the aforementioned B10 to B30, in B40 corresponding to the automatic vehicle speed control unit 64, the extra system-required driving force Fdemv for controlling the vehicle speed V based on the target vehicle speed Vtgt set by the driver is calculated. Subsequently to the aforementioned B30 and the aforementioned B40, in B50 corresponding to the required driving force calculation unit 62, it is selected, according to a driving force arbitration procedure determined in advance, which one of the driver-required driving force Fdemd calculated in B30 and the extra system-required driving force Fdemv calculated in B40 should be given higher priority. This selected required driving force Fdem is set as the post-arbitration required driving force Fdema. Then in B60 corresponding to the engine output control unit 66, the target engine torque Tetgt for realizing the post-arbitration required driving force Fdema is calculated through the use of the equation (2). By the same token, subsequently to the aforementioned B50 and in parallel with the execution of the aforementioned B60, the target engine torque Tetgt for realizing the post-arbitration required driving force Fdema is calculated through the use of the equation (2) in B70 corresponding to the engine output control unit 66, as is the case with the aforementioned B60. Then in B80 corresponding to the continuously variable transmission control unit 68, the virtual throttle opening degree tapi is calculated by applying the target engine torque Tetgt and the target input shaft rotational speed Nintgt (or the engine rotational speed Ne converted from the target input shaft rotational speed Nintgt) to, for example, the engine torque map shown in FIG. 3. Subsequently to the aforementioned B10 and the aforementioned B80, in B90 corresponding to the continuously variable transmission control unit 68, one of the driver-required throttle opening degree tapd calculated in B10 and the virtual throttle opening degree tapi calculated in B80 is selected (set) as the throttle opening degree tapsh for speed ratio control, based on a result of selection (a result of arbitration) of the required driving force Fdem in the aforementioned B50. In concrete terms, when the result of arbitration in the aforementioned B50 is the driver-required driving force Fdemd, the driver-required throttle opening degree tapd is set as the throttle opening degree tapsh for speed ratio control. On the other hand, when the result of selection in the aforementioned B50 is the extra system-required driving force Fdemv, the virtual throttle opening degree tapi is set as the throttle opening degree tapsh for speed ratio control. In parallel with the execution of the aforementioned B90, in B100 corresponding to the throttle opening degree correction unit 69, the throttle opening degree correction amount Δtap corresponding to the auxiliary load torque Taux is calculated based on the target engine torque Tetgt, the auxiliary load torque Taux, and the target input shaft rotational speed Nintgt (or the engine rotational speed Ne converted from the target input shaft rotational speed Nintgt). In concrete terms, in FIG. 7, in B102 in the aforementioned B100, the load-added engine torque Tea is calculated by summating the target engine torque Tetgt and the auxiliary load torque Taux. Besides, in B104 in the aforementioned B100, the basic throttle opening degree tapb is calculated by applying the target engine torque Tetgt and the target input shaft rotational speed Nintgt (or the engine rotational speed Ne converted from the target input shaft rotational speed Nintgt) to, for example, the engine torque map shown in FIG. 3. Besides, in B106 in the aforementioned B100, in parallel with the execution of the aforementioned B104, the load-added throttle opening degree tapea is calculated by applying the load-added engine torque Tea and the target input shaft rotational speed Nintgt (or the engine rotational speed Ne converted from the target input shaft rotational speed Nintgt) to, for example, the engine torque map shown in FIG. 3. Besides, in B108 in the aforementioned B100, the throttle opening degree correction amount Δtap is calculated by subtracting the basic throttle opening degree tapb from the load-added throttle opening degree tapea. Besides, in B109 in the aforementioned B100, the smoothing process of changes in the throttle opening degree correction amount Δtap is executed in the case where the throttle opening degree correction amount Δtap changes in such a manner as to increase beyond its last value. On the other hand, the aforementioned smoothing process is not executed in the case where the throttle opening degree correction amount Δtap changes in such a manner as to decrease below its last value. Returning to FIG. 6, subsequently to the aforementioned B90 and the aforementioned B100, in B110 corresponding to the throttle opening degree correction unit 69, the post-correction throttle opening degree tapshc for speed ratio control is calculated by adding the throttle opening degree correction amount Δtap to the throttle opening degree tapsh for speed ratio control. Subsequently to the aforementioned B110, in B120 corresponding to the continuously variable transmission control unit 68, the target input shaft rotational speed Nintgt is calculated by applying the vehicle speed V (or the output shaft rotational speed Nout) and the post-correction throttle opening degree tapshc for speed ratio control to the shifting map shown in FIG. 4. Besides, the target speed ratio γtgt (=Nintgt/Nout) is calculated based on this target input shaft rotational speed Nintgt.

As described above, according to the present embodiment of the invention, the engine 12 can be operated at the engine operating point PE with good fuel economy even when the auxiliaries (e.g., the alternator 52, the air-conditioner compressor 54 and the like) are driven, by calculating the throttle opening degree tapsh for speed ratio control (the post-correction throttle opening degree tapshc for speed ratio control) in consideration of the auxiliary load torque Taux.

Besides, according to the present embodiment of the invention, in correcting the throttle opening degree tapsh for speed ratio control in accordance with the auxiliary load torque Taux, when the throttle opening degree tapshc for speed ratio control is corrected in such a manner as to increase such that an engine rotational speed Ne rises, the engine rotational speed Ne does not suddenly change due to the smoothing process of changes in the throttle opening degree correction amount Δtap (changes in the post-correction throttle opening degree tapshc for speed ratio control, from a different viewpoint). Therefore, the feeling of strangeness developed by the driver can be reduced. Besides, the correction that is made in such a manner that the engine rotational speed Ne falls does not lead to a feeling of acceleration, and is unlikely to make the driver develop a feeling of strangeness. Therefore, when the post-correction throttle opening degree tapshc for speed ratio control is corrected in such a manner as to decrease, the aforementioned smoothing process is not executed. Thus, the engine operating point PE can be changed at an early stage, and the deterioration in fuel economy can be suppressed.

Besides, according to the present embodiment of the invention, the smoothing process is a filtering process for retarding changes in the throttle opening degree correction amount Δtap or a guarding process for limiting changes in the throttle opening degree correction amount Δtap to the predetermined change amount. Therefore, the smoothing process of changes in the throttle opening degree correction amount Δtap (changes in the post-correction throttle opening degree tapshc for speed ratio control, from a different viewpoint) can be appropriately executed.

Besides, according to the present embodiment of the invention, in the control apparatus for the vehicle 10 that performs engine torque control and shifting control based on the post-arbitration required driving force Fdema after the driver-required driving force Fdemd corresponding to the accelerator opening degree pap (or the driver-required throttle opening degree tapd) and the extra system-required driving force Fdemv for use in automatic vehicle speed control are arbitrated, the virtual throttle opening degree tapi is calculated using the target input shaft rotational speed Nintgt and the target speed ratio γtgt, which are set through the use of the shifting map that is determined in advance such that the engine operating point PE follows the optimal fuel economy line Lfe, in the case where the extra system-required driving force Fdemv for use in automatic vehicle speed control is selected as well as in the case where the driver-required driving force Fdemd is selected. Therefore, the engine 12 can be operated at the engine operating point PE with good fuel economy. Besides, the engine 12 can be operated at the engine operating point PE with good fuel economy even when the auxiliaries are driven. In this case, the feeling of strangeness developed by the driver can be reduced, and the deterioration in fuel economy can be suppressed.

Although the embodiment of the invention has been described hereinabove in detail based on the drawings, the invention is applicable to other aspects as well.

For example, in the foregoing embodiment of the invention, a value smoothed by a filter (e.g., a low-pass filter) may be used as the driver-required driving force Fdemd for use in arbitration of the required driving force Fdem.

Besides, in the foregoing embodiment of the invention, the engine 12 is exemplified as the driving force source for running, but the invention is not limited to this aspect. For example, the engine 12 may be an engine that is equipped with an exhaust turbine-type supercharger, or an engine that is equipped with a mechanical supercharger. Besides, another prime mover such as an electric motor or the like can also be adopted in combination with the engine 12, as a driving force source for running. Besides, the motive power of the engine 12 is transmitted to the continuously variable transmission 26 via the torque converter 18, but the invention is not limited to this aspect. For example, another hydraulic power transmission such as a fluid coupling that does not have the function of torque amplification or the like may be employed instead of the torque converter 18. Alternatively, this hydraulic power transmission is not absolutely required to be provided.

Besides, in the foregoing embodiment of the invention, the continuously variable transmission 26 is a belt-type continuously variable transmission, but the invention is not limited to this aspect. For example, although the transmission belt 40 is exemplified as a transmission element of the continuously variable transmission 26, this transmission element may be a transmission chain. In this case, the continuously variable transmission is a chain-type continuously variable transmission. In the broad sense of the term, however, the concept of the belt-type continuously variable transmission may encompass the chain-type continuously variable transmission. Besides, the continuously variable transmission may be a traction-type continuously variable transmission.

Incidentally, the foregoing is nothing more than one embodiment of the invention. The invention can be carried out in aspects that are subjected to various modifications and improvements based on the knowledge of those skilled in the art.

What is claimed is:

1. A control apparatus for a vehicle, the vehicle including an engine,
   an auxiliary configured to operate by a motive power of the engine, and
   a continuously variable transmission configured to transmit the motive power of the engine to a driving wheel,
   the control apparatus comprising:
   an electronic control unit configured to
   (a) perform shifting control of the continuously variable transmission such that an operating point of the engine follows an optimal fuel economy line, and
   (b) correct a required output amount that is used for shifting control of the continuously variable transmission and that is based on an operation by a driver, in accordance with a load torque resulting from the auxiliary, such that (i) a smoothing process of changes in the required output amount is executed when the required output amount is increased, and that (ii) the smoothing process is not executed when the required output amount is reduced.

2. The control apparatus according to claim 1, wherein the smoothing process is a filtering process or a guarding process, the filtering process is a process of retarding changes in a correction amount of the required output amount corresponding to the load torque resulting from the auxiliary, and the guarding process is a process of limiting changes in the correction amount to a predetermined change amount.

3. The control apparatus according to claim 1, wherein the electronic control unit is configured to
   (c) calculate a required driving force corresponding to the required output amount,
   (d) calculate a target engine torque that realizes the required driving force,
   (e) calculate the correction amount of the required output amount for use in shifting control of the continuously variable transmission, based on the target engine torque and the load torque resulting from the auxiliary, and
   (f) calculate a post-correction required output amount for use in shifting control of the continuously variable transmission, by adding the correction amount to the required output amount.

4. A control apparatus for a vehicle, the vehicle including an engine,
   an auxiliary configured to operate by a motive power of the engine, and
   a continuously variable transmission configured to transmit the motive power of the engine to a driving wheel,
   the control apparatus comprising:
   an electronic control unit configured to
   (a) perform shifting control of the continuously variable transmission such that an operating point of the engine follows an optimal fuel economy line, and
   (b) correct a required output amount that is used for shifting control of the continuously variable transmission and that realizes a required driving force resulting from automatic vehicle speed control for assisting a driver in driving, in accordance with a load torque resulting from the auxiliary, such that (i) a smoothing process of changes in the required output amount is executed when the required output amount is increased, and that (ii) the smoothing process is not executed when the required output amount is reduced.

5. The control apparatus according to claim 4, wherein the smoothing process is a filtering process or a guarding process, the filtering process is a process of retarding changes in a correction amount of the required output amount corresponding to the load torque resulting from the auxiliary, and the guarding process is a process of limiting changes in the correction amount to a predetermined change amount.

6. The control apparatus according to claim 4, wherein the electronic control unit is configured to
   (c) calculate a required driving force resulting from the automatic vehicle speed control, (d) calculate a target engine torque that realizes the required driving force,
(e) calculate the correction amount of the required output amount for use in shifting control of the continuously variable transmission, based on the target engine torque and the load torque resulting from the auxiliary, and
(f) calculate a post-correction required output amount for use in shifting control of the continuously variable transmission, by adding the correction amount to a required output amount from which the target engine torque is obtained.

\* \* \* \* \*